United States Patent
Goto et al.

(10) Patent No.: US 10,625,246 B2
(45) Date of Patent: Apr. 21, 2020

(54) OXYGEN STORAGE MATERIAL AND METHOD FOR PRODUCING THE SAME

(71) Applicant: TOYOTA JIDOSHA KABUSHIKI KAISHA, Toyota-shi, Aichi (JP)

(72) Inventors: Yoshihiro Goto, Nagakute (JP); Akira Morikawa, Nagakute (JP); Masahide Miura, Toyota (JP); Nobuyuki Takagi, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 16/392,823

(22) Filed: Apr. 24, 2019

(65) Prior Publication Data

US 2019/0321807 A1    Oct. 24, 2019

(30) Foreign Application Priority Data

Apr. 24, 2018    (JP) .................. 2018-083064

(51) Int. Cl.
| | | |
|---|---|---|
| *B01J 21/04* | (2006.01) | |
| *B01J 23/00* | (2006.01) | |
| *B01J 23/83* | (2006.01) | |
| *B01J 37/04* | (2006.01) | |
| *B01J 37/08* | (2006.01) | |
| *F01N 3/10* | (2006.01) | |

(52) U.S. Cl.
CPC .............. *B01J 23/83* (2013.01); *B01J 23/002* (2013.01); *B01J 37/04* (2013.01); *B01J 37/086* (2013.01); *B01J 2523/31* (2013.01); *B01J 2523/3706* (2013.01); *B01J 2523/845* (2013.01); *F01N 3/101* (2013.01); *F01N 2370/02* (2013.01); *F01N 2570/16* (2013.01)

(58) Field of Classification Search
CPC . B01J 23/002; B01J 23/83; B01J 21/04; B01J 37/04; B01J 37/086
See application file for complete search history.

(56) References Cited

U.S. PATENT DOCUMENTS

| | | | | |
|---|---|---|---|---|
| 5,447,705 | A * | 9/1995 | Petit ................. | B01J 23/002 423/418.2 |
| 7,202,194 | B2 * | 4/2007 | Muhammed ........ | C01G 25/006 502/304 |
| 7,381,394 | B2 * | 6/2008 | Tanaka ............... | B01D 53/945 423/263 |
| 7,824,574 | B2 * | 11/2010 | White ................. | B01J 23/002 252/373 |

(Continued)

FOREIGN PATENT DOCUMENTS

JP    2000-042368 A    2/2000

*Primary Examiner* — Cam N. Nguyen
(74) *Attorney, Agent, or Firm* — Dickinson Wright PLLC

(57) ABSTRACT

An oxygen storage material comprises a La—Co—Al-based composite oxide containing lanthanum, cobalt and aluminum. The La—Co—Al-based composite oxide is in a form in which at least part of the aluminum is solid-dissolved in a La—Co composite oxide having a perovskite structure, and has a composition expressed by the following chemical formula (1):

$$LaCo_yAl_xO_\delta \qquad (1)$$

where x and y are numbers satisfying conditions of 0<x<1 and 0<y<1, where x+y=0.5 to 1.5, and δ is a number of 1.5 to 4.5.

8 Claims, 3 Drawing Sheets

(56) References Cited

U.S. PATENT DOCUMENTS

| | | | |
|---|---|---|---|
| 8,043,992 B2 * | 10/2011 | Hatanaka | B01D 53/945 423/594.12 |
| 2004/0186016 A1 * | 9/2004 | Bog | B01D 53/945 502/304 |

* cited by examiner

OXYGEN STORAGE MATERIAL AND METHOD FOR PRODUCING THE SAME

RELATED APPLICATION

This application claims priority to Japanese Patent Application No. 2018-083064, filed on Apr. 24, 2018, including the specification, drawings and abstract, the entire disclosure of which is incorporated herein by reference.

BACKGROUND OF THE INVENTION

Field of the Invention

The present invention relates to an oxygen storage material and a method for producing the same.

Related Background Art

What is termed a three-way catalyst is known as a catalyst for purification of exhaust gas capable of oxidizing carbon monoxide (CO) and hydrocarbon (HC) and simultaneously reducing nitrogen oxide (NOx) in exhaust gas emitted from internal combustion engines such as automotive engines.

For purification of an exhaust gas using a catalyst for purification of exhaust gas, it is known to use, as a support or a promoter for the catalyst for purification of exhaust gas, a material having an oxygen storage capacity (OSC), that is, a capacity to store oxygen when the concentration of oxygen in the exhaust gas is high and release oxygen when the concentration of oxygen in the exhaust gas is low in order to absorb variations in the concentration of oxygen in the exhaust gas and to thus enhance the exhaust gas purifying capability.

The use of ceria as such an oxygen storage material having OSC has been conventionally preferred, and various types of composite oxides containing ceria, the other lanthanide elements, and the like have been studied in recent years. For example, Japanese Unexamined Patent Application Publication No. 2000-42368 (PLT 1) discloses, as a catalyst comprising an oxygen storage material having an oxygen storage capability to selectively separate and adsorb oxygen from exhaust gas within a temperature range from room temperature to 200° C. and having an oxygen release capability to release oxygen within a temperature range of 200° C. to 400° C., a catalyst comprising a composite oxide with a perovskite structure expressed by the following composition formula: [A] [B]O$_y$ (where A represents at least one element selected from the group consisting of La, Sr, Ba, Pb, Nd and Ce, B represents at least one element selected from the group consisting of Al, Ti, Cr, Mn, Co, Fe and Ni, O represents oxygen, and y indicates the number of oxygen atoms necessary to satisfy the valences of the elements).

However, in recent years, the required properties for the catalyst for purification of exhaust gas have been becoming higher and higher. According to the knowledge of the present inventors, there is a demand for an oxygen storage material having an oxygen storage capacity (OSC) and being capable of exhibiting a good oxygen release rate at a relatively low temperature of about 400° C., and having such good heat resistance that the material can be stable even under a high temperature condition of about 600° C. to about 1000° C. For this reason, the conventional oxygen storage materials as described in PLT 1 are not always sufficient any more.

CITATION LIST

Patent Literature

[PTL 1] Japanese Unexamined Patent Application Publication No. 2000-42368

SUMMARY OF THE INVENTION

Problems to be Solved by the Invention

The present invention was made in view of the problems of the conventional technique, and has an object to provide an oxygen storage material which is capable of exhibiting a good oxygen release rate at a relatively low temperature of about 400° C., and having such a good heat resistance that thermal decomposition of the material is sufficiently suppressed under a high temperature condition at about 600° C. to about 1000° C., and to provide a production method capable of obtaining such an oxygen storage material efficiently and reliably.

Means for Solving the Problems

The present inventors have conducted intensive studies in order to achieve the above-described object. As a result, the present inventors have found that, when a La—Co—Al-based composite oxide having a predetermined composition is produced by solid-dissolving aluminum into a La—Co composite oxide having a perovskite structure, an oxygen storage material can be obtained which is capable of exhibiting a good oxygen release rate at a relatively low temperature of about 400° C. and having such good heat resistance that the thermal decomposition is sufficiently suppressed under a high temperature condition at about 600° C. to about 1000° C. This finding has led to the completion of the present invention.

The oxygen storage material of the present invention is an oxygen storage material comprising a La—Co—Al-based composite oxide containing lanthanum, cobalt and aluminum, wherein the La—Co—Al-based composite oxide is in a form in which at least part of the aluminum is solid-dissolved in a La—Co composite oxide having a perovskite structure and has a composition expressed by the following chemical formula (1):

$$LaCo_y Al_x O_\delta \qquad (1)$$

where x and y are numbers satisfying conditions of 0<x<1 and 0<y<1, where x+y=0.5 to 1.5, and δ is a number of 1.5 to 4.5.

Then, a method for producing an oxygen storage material of the present invention is a method comprising the steps of:

forming a metal hydroxycarboxylic acid complex in a solution containing a lanthanum salt, a cobalt salt and an aluminum salt as raw material salts, hydroxycarboxylic acid, and glycol;

causing esterification reaction in the solution to form a polymer gel in which the metal hydroxycarboxylic acid complex is dispersed;

thermally decomposing the polymer gel to obtain a metal oxide precursor; and calcining the metal oxide precursor to obtain the oxygen storage material of the present invention comprising the La—Co—Al-based composite oxide.

In the oxygen storage material and the production method thereof of the present invention, in the chemical formula (1), x and y are preferably numbers satisfying conditions of x=0.1 to 0.5 and y=0.5 to 0.9, where x+y=1, and δ is preferably 3.

Then, in the oxygen storage material and the production method thereof of the present invention, 90 at % or more of the aluminum is preferably solid-dissolved in the La—Co composite oxide.

Further, in the oxygen storage material and the production method thereof of the present invention, the La—Co—Al-based composite oxide is preferably a composite oxide having a perovskite structure in which a tolerance factor (t) is preferably within a range of 0.975 to 1.007, the tolerance factor (t) defined by the following formula (2):

$$t=(r_A+r_O)/\{2^{1/2} \times (r_B+r_O)\} \qquad (2)$$

where t is the tolerance factor, $r_A$ is an ionic radius of La, $r_B$ is an arithmetic mean of ionic radii of Co and Al, and $r_O$ is an ionic radius of an oxide ion ($O^{2-}$).

Here, it has not been entirely clarified why such an oxygen storage material of the present invention can exhibit a good oxygen release rate even at a relatively low temperature of about 400° C. and have such high heat resistance as to sufficiently suppress the thermal decomposition under a high temperature condition at about 600° C. to about 1000° C., but the present inventors surmise as follows. Specifically, the present inventors surmise that the La—Co—Al-based composite oxide constituting the oxygen storage material of the present invention can sufficiently suppress the thermal decomposition under a high temperature condition at about 600° C. to about 1000° C. because the aluminum solid-dissolved in the La—Co composite oxide having the perovskite structure relaxes a distortion of the perovskite structure and thereby stabilizes the perovskite phase. Further, the present inventors surmise that the oxygen storage material of the present invention can exhibit a good oxygen release rate even at a relatively low temperature of about 400° C. because the aluminum solid-dissolved in the La—Co composite oxide having the perovskite structure reduces the activation energy for oxygen release.

Moreover, according to the method for producing an oxygen storage material of the present invention, the above-described oxygen storage material of the present invention can be obtained efficiently and reliably. In this regard, the present inventors surmise the reason for the above effect as follows. Specifically, the method for producing an oxygen storage material of the present invention is a method for obtaining the La—Co—Al-based composite oxide through a so-called polymerized complex method. In this method, a metal hydroxycarboxylic acid complex (hydroxycarboxylic acid complex containing lanthanum, cobalt and aluminum) is first formed in a solution containing a lanthanum salt, a cobalt salt and an aluminum salt as raw material salts, hydroxycarboxylic acid, and glycol. Next, the esterification reaction between the hydroxycarboxylic acid and the glycol in the solution forms a polymer gel in which the metal hydroxycarboxylic acid complex is dispersed, and the polymer gel thus formed is thermally decomposed to obtain a metal oxide precursor in which the metal elements (lanthanum, cobalt and aluminum) are uniformly dispersed. Then, the metal oxide precursor is calcined. The present inventors surmise that the perovskite phase in the form in which the aluminum is sufficiently solid-dissolved in the La—Co composite oxide having the perovskite structure can be obtained as a single phase through the above-described method.

Effects of the Invention

According to the present invention, it is possible to provide an oxygen storage material which is capable of exhibiting a good oxygen release rate even at a relatively low temperature of about 400° C., and has such high heat resistance as to sufficiently suppress the thermal decomposition under a high temperature condition at about 600° C. to about 1000° C., and to provide a production method capable of obtaining such an oxygen storage material efficiently and reliably.

DETAILED DESCRIPTION OF THE PREFERRED EMBODIMENTS

Figure 1:
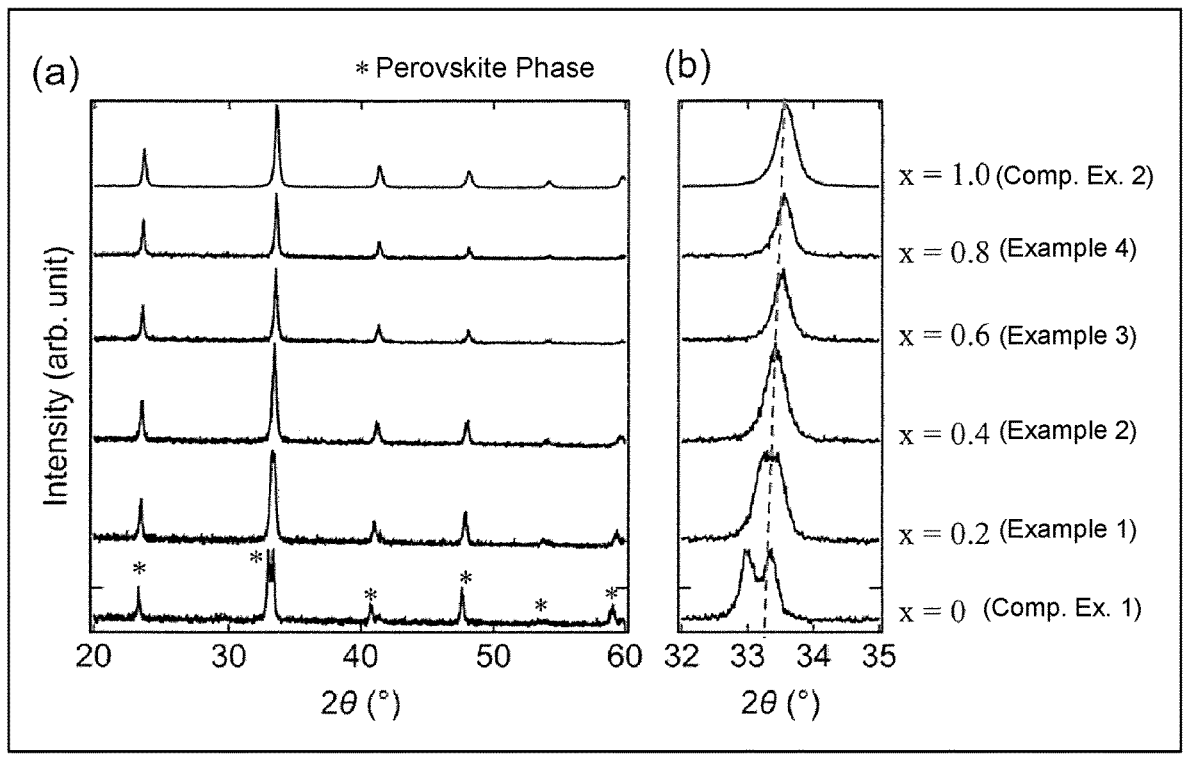
FIG. 1 is a graph presenting X-ray diffraction patterns of composite oxides obtained in Examples 1 to 4 and Comparative Examples 1 and 2, a part (a) presents XRD full angular patterns and a part (b) presents patterns at 2θ=32° to 35°.

Hereinafter, the present invention is described in detail based on preferred embodiments of the present invention.

First, an oxygen storage material of the present invention is described. The oxygen storage material of the present invention is an oxygen storage material comprising a La—Co—Al-based composite oxide containing lanthanum, cobalt and aluminum, wherein the La—Co—Al-based composite oxide is in a form in which at least part of the aluminum is solid-dissolved in a La—Co composite oxide having a perovskite structure, and has a composition expressed by the following chemical formula (1):

$$LaCo_yAl_xO_\delta \qquad (1)$$

where x and y are numbers satisfying conditions of 0<x<1 and 0<y<1, where x+y=0.5 to 1.5, and δ is a number of 1.5 to 4.5.

The La—Co—Al-based composite oxide according to the present invention is the composite oxide containing the lanthanum (La), the cobalt (Co) and the aluminum (Al), and is in the form in which at least part of the aluminum is solid-dissolved in the La—Co composite oxide having the perovskite structure. Basically, the La—Co composite oxide has a perovskite structure, and has a good oxygen storage capacity (OSC) at a relatively low temperature. However, the La—Co composite oxide, as it is, has low heat resistance and an insufficient oxygen release rate. In addition, even though alumina is simply added to (for example, physically mixed in) the La—Co composite oxide, the alumina does not contribute to the enhancements of the heat resistance and the oxygen release rate. In contrast, the La—Co—Al-based composite oxide according to the present invention is in the form in which at least part of the aluminum is solid-dissolved in the La—Co composite oxide having the perovskite structure. The present inventors surmise that Al substituted for part of the Co site while maintaining the perovskite structure relaxes a distortion of the perovskite structure and stabilizes the perovskite phase to enhance the heat resistance, and reduces the activation energy for oxygen release to enhance the oxygen release rate.

Here, the space group of the perovskite structure in the La—Co composite oxide is generally R-3c. Assuming such a space group of the perovskite structure, the formation of the solid solution phase in which the aluminum is solid-dissolved in the La—Co composite oxide having the perovskite structure can be confirmed by observing that a change in the lattice parameter (lattice constant) demonstrates linearity along with an increase in the amount of aluminum solid-dissolved in accordance with Vegard's law.

In the oxygen storage material of the present invention, at least part of the aluminum just has to be solid-dissolved in the La—Co composite oxide. However, from the viewpoint that the oxygen release rate and the heat resistance are further enhanced, it is preferable that 90 at % or more of the aluminum be solid-dissolved in the La—Co composite oxide, and it is particularly preferable that 95 at % or more of the aluminum be solid-dissolved in the La—Co composite oxide. In this regard, the solid dissolution of 90 at % or more (particularly preferably, 95 at % or more) of the aluminum in the La—Co composite oxide as described above can be verified by an X-ray diffraction (XRD) measurement, to be described later, observing the absence of peaks corresponding to the alumina ($Al_2O_3$) that is not solid-dissolved (the peaks that appear at $2\theta$ angles of $35.2°$ and $57.5°$ in an X-ray diffraction pattern using CuKα), in other words, observing that the amount of the alumina not solid-dissolved is equal to or lower than a detection limit. In this connection, a measurement method employable as such an X-ray diffraction (XRD) measurement includes measuring under conditions of 40 KV, 40 mA, and $2\theta=5°$/min with the CuKα ray using a measuring device under the trade name "RINT-Ultima" manufactured by Rigaku Corporation. In addition, the "peak" in a diffraction line refers to one having a height of 30 cps or more from the base line to the peak top.

Such a La—Co—Al-based composite oxide according to the present invention has a composition expressed by the following chemical formula (1):

$$LaCo_yAl_xO_\delta \qquad (1)$$

where x and y are numbers satisfying conditions of $0<x<1$ and $0<y<1$, where $x+y=0.5$ to 1.5, and δ is a number of 1.5 to 4.5. If the content (x) of Al is 0 (zero), the composite oxide has a good oxygen storage capacity (OSC) at a relatively low temperature, but has low heat resistance and also has an insufficient oxygen release rate as described above. Meanwhile, if the content (y) of Co is 0 (zero), the OSC is not obtained. Then, if the total content (x+y) of Al and Co is less than the lower limit, the sufficient OSC is not obtained. On the other hand, if the total content exceeds the upper limit, the composite oxide cannot be obtained as a single phase. From the viewpoint that the oxygen release rate and the heat resistance are further enhanced, x is more preferably 0.1 to 0.5, y is more preferably 0.5 to 0.9, and x+y is more preferably 1.

Note that δ in the chemical formula (1) is the number of oxygen atoms (O) in the composition. A value of δ is calculated from the amounts and valences of the contained elements and varies within a range of 1.5 to 4.5, where δ is more preferably 2 to 4 and particularly preferably 3.

In the La—Co—Al-based composite oxide according to the present invention, the distortion of the perovskite structure is relaxed by the aluminum solid-dissolved in the La—Co composite oxide having the perovskite structure as described above. In this connection, a tolerance factor related to the distortion of the perovskite structure is preferably within a range of 0.975 to 1.007 and particularly preferably in a range of 0.977 to 0.990, the tolerance factor (t) defined by the following formula (2):

where t is a tolerance factor, $r_A$ is an ionic radius of La (1.36 Å), $r_B$ is an arithmetic mean of an ionic radius of Co (0.61 Å) and an ionic radius of Al (0.535 Å), and $r_O$ is an ionic radius of an oxide ion ($O^{2-}$) (1.4 Å). If the tolerance factor (t) is less than the lower limit, it tends to be difficult to achieve sufficient enhancements of the oxygen release rate and the heat resistance due to a reduction in the stability of the perovskite structure. On the other hand, if the tolerance factor (t) exceeds the upper limit, it similarly tends to be difficult to achieve sufficient enhancements of the oxygen release rate and the heat resistance due to a reduction in the stability of the perovskite structure.

In addition, a specific surface area of the La—Co—Al-based composite oxide according to the present invention is not particularly limited, but is preferably 2 to 20 $m^2$/g. If the specific surface area is less than the lower limit, it tends to be difficult to obtain the sufficient OSC. On the other hand, if the specific surface area exceeds the upper limit, it tends to be difficult to obtain the sufficient heat resistance. Here, such a specific surface area can be calculated as a BET specific surface area from an adsorption isotherm using the BET isotherm adsorption equation, and can be obtained for example by using a commercially-available fully-automated specific surface area measuring device (MicroSorp MODEL-4232 manufactured by Microdata).

Moreover, an average crystal size in the La—Co—Al-based composite oxide according to the present invention is not particularly limited, but is preferably 20 to 200 nm. If the average crystal size is less than the lower limit, it tends to be difficult to obtain the sufficient heat resistance. On the other hand, if the average crystal size exceeds the upper limit, it tends to be difficult to obtain the sufficient OSC. Here, such an average crystal size can be calculated by using commercially available analysis software (for example, Rietveld analysis software named "Jana2006") from the X-ray diffraction pattern obtained using CuKα by the X-ray diffraction measurement.

Then, the La—Co—Al-based composite oxide according to the present invention may further contain at least one element selected from the group consisting of rare-earth elements other than lanthanum, and alkaline earth elements. When the La—Co—Al-based composite oxide according to the present invention further containing such an element is used as a support for a catalyst for purification of exhaust gas, the catalyst tends to exhibit higher exhaust gas purifying capability. As such rare-earth elements other than lanthanum, there are cerium (Ce), scandium (Sc), yttrium (Y), praseodymium (Pr), neodymium (Nd), samarium (Sm), gadolinium (Gd), terbium (Tb), dysprosium (Dy), ytterbium (Yb), lutetium (Lu), and so on. Among them, Ce, Nd, Pr, Y and Sc are preferable and Ce, Y and Nd are more preferable from the viewpoint that the La—Co—Al-based composite oxide tends to cause a strong interaction with a noble metal and thereby have a high affinity for the noble metal when the noble metal is supported on the composite oxide. Meanwhile, as such alkaline earth metal elements, there are magnesium (Mg), calcium (Ca), strontium (Sr), barium (Ba) and radium (Ra). Among them, Mg, Ca and Ba are preferable from the viewpoint that the La—Co—Al-based composite oxide tends to cause a strong interaction with a noble metal and thereby have a high affinity for the noble metal when the noble metal is supported on the composite oxide. Since such rare-earth elements (other than lanthanum) and such alkaline earth metal elements, which have a low electronegativity, cause a strong interaction with a noble metal, these elements can be bound to the noble metal via oxygen in an oxidation atmosphere, and thereby inhibit evaporation and sintering of the noble metal. Thus, these elements tend to be able to sufficiently retard degradation of the noble metal, which is an active spot in exhaust gas purification.

When at least one element selected from the group consisting of the rare-earth elements other than lanthanum, and the alkaline earth elements is further contained, the content of the element in the La—Co—Al-based composite oxide is preferably 1 to 20% by mass and more preferably 3 to 10% by mass. If the content of the element is less than the lower limit, it tends to be difficult to sufficiently enhance the interaction of the composite oxide thus obtained with a noble metal when the noble metal is supported on the composite oxide. On the other hand, if the content of the element exceeds the upper limit, the oxygen storage capacity tends to decrease.

The oxygen storage material of the present invention comprises the La—Co—Al-based composite oxide, is capable of exhibiting a good oxygen release rate even at a relatively low temperature of about 400° C., and has such good heat resistance as to sufficiently suppress thermal decomposition under a high temperature condition at about 600° C. to about 1000° C. For these reasons, the oxygen storage material of the present invention is favorably usable as a support or a promoter for a catalyst for purification of exhaust gas. A preferred application example using the oxygen storage material of the present invention is a catalyst for purification of exhaust gas comprising a support composed of the oxygen storage material of the present invention, and a noble metal supported on the support. As such a noble metal, there are platinum, rhodium, palladium, osmium, iridium, gold, silver, and so on. Moreover, in another application example, the oxygen storage material of the present invention is arranged around a catalyst for purification of exhaust gas in which a noble metal is supported on fine particles of another catalyst support.

Next, a method for producing the oxygen storage material of the present invention is described.

The method for producing the above-described La—Co—Al-based composite oxide according to the present invention is not particularly limited. The La—Co—Al-based composite oxide according to the present invention may be obtained by any known method termed a co-precipitation method, a reverse co-precipitation method, a solid-phase synthesis method, and a hydrothermal synthesis method. However, from the viewpoint that an oxygen storage material having further enhanced oxygen release rate and heat resistance tends to be obtained, it is preferable to employ a method for producing an oxygen storage material of the present invention through a polymerized complex method as elaborated below.

The method for producing an oxygen storage material of the present invention comprises:

a step of forming a metal hydroxycarboxylic acid complex in a solution containing a lanthanum salt, a cobalt salt and an aluminum salt as raw material salts, hydroxycarboxylic acid, and glycol (complex formation step);

a step of causing esterification reaction in the solution to form a polymer gel in which the metal hydroxycarboxylic acid complex is dispersed (polymer gel formation step);

a step of thermally decomposing the polymer gel to obtain a metal oxide precursor (precursor formation step); and a step of calcining the metal oxide precursor to obtain the oxygen storage material of the present invention comprising the La—Co—Al-based composite oxide (calcination step).

As the lanthanum salt, the cobalt salt and the aluminum salt used as the raw material salts, there are nitrates, chlorides, sulfates, acetates, and the like of lanthanum, cobalt and aluminum. Then, as the hydroxycarboxylic acid, there are citric acid, isocitric acid, and the like. Moreover, as the glycol, there are ethylene glycol, propylene glycol, and the like.

In the production method of the present invention, the metal hydroxycarboxylic acid complex (the hydroxycarboxylic acid complex containing lanthanum, cobalt and aluminum) is first formed in the solution containing the raw material salts, the hydroxycarboxylic acid, and the glycol in the complex formation step. In this step, it is preferable that the raw material salts be mixed such that the metal atoms satisfy the stoichiometric ratio in accordance with the composition (target composition) of the target La—Co—Al-based composite oxide. In addition, the amount of the hydroxycarboxylic acid in the solution is preferably 4 to 8 equivalents with respect to the total amount of cations (the total amount of metal ions) in the solution. Moreover, the glycol may be used alone as the solvent in the solution. Instead, the raw material salts may be dissolved in advance in pure water in an amount close to the minimum necessary amount (approximately, 1 to 2 times the minimum necessary amount), and then the resultant mixture may be added with the hydroxycarboxylic acid and the glycol to obtain the solution.

Next, in the polymer gel formation step, esterification reaction between the carboxyl groups in the hydroxycarboxylic acid and hydroxyl groups in the glycol is allowed to proceed sequentially in the solution to form a polymer gel in which the metal hydroxycarboxylic acid complex is dispersed. The temperature and time for such a heat treatment (esterification process) in the polymer gel formation step are not particularly limited, but are preferably in a temperature range of 100 to 200° C. and about 5 to 60 minutes.

Subsequently, in the precursor formation step, the polymer gel is thermally decomposed to obtain a metal oxide precursor in which the metal elements (lanthanum, cobalt and aluminum) are uniformly dispersed. The temperature and time for such a heat treatment in the precursor formation step are not particularly limited, but are preferably in a temperature range of 300 to 500° C. and about 1 to 5 hours. Additionally, the atmosphere for the heat treatment is not particularly limited, but may be an ambient atmosphere or an inactive atmosphere of argon, nitrogen, helium, and so on.

After that, in the calcination step, the metal oxide precursor is calcined to obtain the above-described La—Co—Al-based composite oxide according to the present invention as a single phase. The temperature and time for such a calcination process in the calcination step are not particularly limited, but are preferably in a temperature range of 600 to 900° C. and about 1 to 10 hours. Additionally, the atmosphere for the calcination process is not particularly limited, but may be an ambient atmosphere or an inactive atmosphere of argon, nitrogen, helium, and so on.

EXAMPLES

Hereinafter, the present invention is described in further details based on Examples and Comparative Examples; however, the present invention should not be limited to the following Examples.

The following reagents were used.
(1) Lanthanum nitrate: $La(NO_3)_3 \cdot 6H_2O$ (purity 99.9%, manufactured by Wako Pure Chemical Industries, Ltd.)
(2) Cobalt nitrate: $Co(NO_3)_2 \cdot 6H_2O$ (purity 99.9%, manufactured by Wako Pure Chemical Industries, Ltd.)
(3) Aluminum nitrate: $Al(NO_3)_3 \cdot 9H_2O$ (purity 98%, manufactured by Wako Pure Chemical Industries, Ltd.)
(4) Citric acid (purity 98%, manufactured by Wako Pure Chemical Industries, Ltd.)
(5) Ethylene glycol (purity 99%, manufactured by Wako Pure Chemical Industries, Ltd.)

Example 1

The target composition was set to $LaCo_{0.8}Al_{0.2}O_3$ (x=0.2 in the composition formula: $LaCo_{1-x}Al_xO_3$) and a La—Co—Al composite oxide having the above-specified composition was obtained through the polymerized complex method as follows.

Specifically, to obtain the target composition, the lanthanum nitrate, the cobalt nitrate and the aluminum nitrate at the stoichiometric ratio were first dissolved in the amounts of feed presented in Table 1 into pure water in the minimum necessary amount presented in Table 1 at ordinary temperature to obtain a solution. After it was confirmed that the solution became transparent, the citric acid in an amount corresponding to 6 equivalents with respect to the total amount of cations and presented in Table 1 and the ethylene glycol in an amount presented in Table 1 were dissolved and mixed with the solution to obtain a solution containing a metal citrate complex. Next, the solution containing the metal citrate complex was heated to and kept at 150° C. for 30 minutes to obtain a polymer gel in which the metal citrate complex was dispersed. Thereafter, the obtained polymer gel was put into an alumina crucible, and then was thermally decomposed in a degreasing furnace by a heat treatment at 400° C. for 2 hours in the ambient atmosphere. As a result, a metal oxide precursor in which the metal elements (lanthanum, cobalt and aluminum) were uniformly dispersed was obtained. Then, the obtained metal oxide precursor was transferred to an electric furnace, and was calcined at 800° C. for 5 hours in the ambient atmosphere to obtain a polycrystalline powder of the La—Co—Al composite oxide having the above-specified composition. The average particle size of the obtained powder was about 5 μm.

Examples 2 to 4

The target compositions were set to:

Example 2

$LaCo_{0.6}Al_{0.4}O_3$ (x=0.4 in the composition formula: $LaCo_{1-x}Al_xO_3$);

Example 3

$LaCo_{0.4}Al_{0.6}O_3$ (x=0.6 in the composition formula: $LaCo_{1-x}Al_xO_3$); and Example 4

$LaCo_{0.2}Al_{0.8}O_3$ (x=0.8 in the composition formula: $LaCo_{1-x}Al_xO_3$)

A powder of a La—Co—Al composite oxide having each of the above-specified compositions was obtained in the same manner as in Example 1 except that the amount of each reagent was changed to an amount presented in Table 1.

Comparative Example 1

The target composition was set to $LaCoO_3$ (x=0 in the composition formula: $LaCo_{1-x}Al_xO_3$), and a powder of a La—Co composite oxide having the above-specified composition was obtained in the same manner as in Example 1 except that the amount of each reagent was changed to an amount presented in Table 1.

Comparative Example 2

The target composition was set to $LaAlO_3$ (x=1 in the composition formula: $LaCo_{1-x}Al_xO_3$), and a powder of a La—Al composite oxide having the above-specified composition was obtained in the same manner as in Example 1 except that the amount of each reagent was changed to an amount presented in Table 1.

Comparative Example 3

Using an agate mortar, 1.00 g of a $La_2O_3$ powder (manufactured by Wako Pure Chemical Industries, Ltd., average particle size: 3 μm) and 0.46 g of a CoO powder (manufactured by Wako Pure Chemical Industries, Ltd., average particle size: 5 μm) were physically mixed such that the atomic ratio of La, Co and Al (La:Co:Al) became 1:1:0, thereby obtaining a mixture powder of $La_2O_3$ and CoO.

Comparative Example 4

Using an agate mortar, 1.00 g of the $LaCoO_3$ powder obtained in Comparative Example 1 and 0.0415 g of an $Al_2O_3$ powder (manufactured by Wako Pure Chemical Industries, Ltd., average particle size: 2 μm) were physically mixed such that the atomic ratio of La, Co and Al (La:Co:Al) became 1:1:0.2, thereby obtaining a mixture powder of $LaCoO_3$ and $Al_2O_3$.

TABLE 1

| | La(NO$_3$)$_3$·6H$_2$O [g] | Co(NO$_3$)$_2$·6H$_2$O [g] | Al(NO$_3$)$_3$·9H$_2$O [g] | Citric Acid [g] | Ethylene Glycol [ml] | H$_2$O [ml] |
|---|---|---|---|---|---|---|
| | Amount of Reagent fed | | | | | |
| Comp. Ex. 1 | 1.0000 | 0.7722 | 0 | 2.6621 | 0.772 | 5.000 |
| Example 1 | 1.0000 | 0.5377 | 0.1733 | 2.6621 | 0.772 | 5.000 |
| Example 2 | 1.0000 | 0.4033 | 0.3465 | 2.6621 | 0.772 | 5.000 |
| Example 3 | 1.0000 | 0.2688 | 0.5198 | 2.6621 | 0.772 | 5.000 |
| Example 4 | 1.0000 | 0.1344 | 0.6931 | 2.6621 | 0.772 | 5.000 |
| Comp. Ex. 2 | 1.0000 | 0 | 0.8663 | 2.6621 | 0.772 | 5.000 |

<X-ray Diffraction (XRD) Measurement>

The crystal phases of the composite oxides obtained in Examples 1 to 4 and Comparative Examples 1 and 2 were measured by an X-ray diffraction method. Here, X-ray diffraction patterns were measured under conditions of 40 KV, 40 mA, and 2θ=5°/min with the CuKα ray using the X-ray diffraction device under the trade name "RINT-Ultima" manufactured by Rigaku Corporation.

The obtained X-ray diffraction patterns are presented in FIG. 1. In FIG. 1, a part (a) presents XRD full angular patterns and apart (b) presents the patterns at 2θ=32° to 35°.

Figure 2:
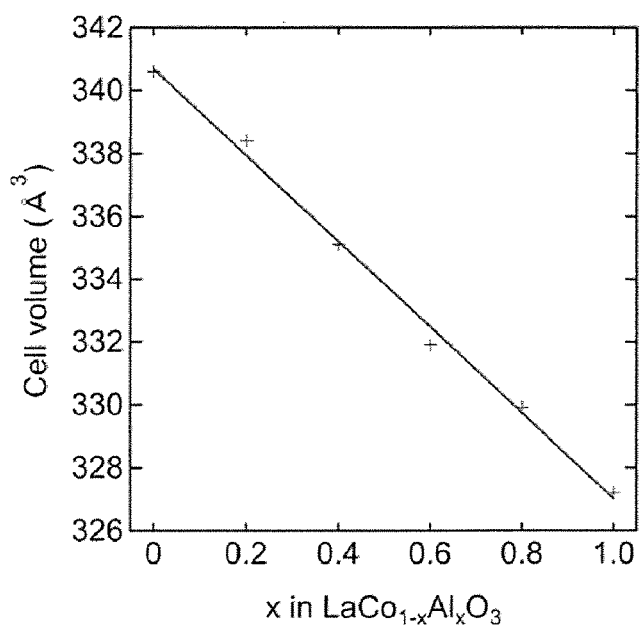
FIG. 2 is a graph presenting an analysis result of the lattice parameters of the composite oxides obtained in Examples 1 to 4 and Comparative Examples 1 and 2.

In addition, the analysis of the lattice parameter (cell volume [Å$^3$]) and the calculation of the average crystal size were preformed using the Rietveld analysis software "Jana2006" from each of the obtained X-ray diffraction patterns, and the results thus obtained are presented in Table 2 and FIG. 2. Note that the FIG. 2 presents the lattice parameter in the case where the space group is R-3c.

<Specific Surface Area Measurement>

The specific surface area (SSA) for each of the composite oxides obtained in Examples 1 to 4 and Comparative Examples 1 and 2 was measured through a single point BET method using a fully-automated specific surface area measuring device (MicroSorp MODEL-4232 manufactured by Microdata). The results thus obtained are presented in Table 2.

TABLE 2

| | x in Composition Formula | Lattice Parameter [Å$^3$] | Average Crystal Size [nm] | Specific Surface Area [m$^2$/g] | Tolerance Factor |
|---|---|---|---|---|---|
| Comp. Ex. 1 | 0 | 340.6 | 87.80 | 3.81 | 0.971 |
| Example 1 | 0.2 | 338.4 | 97.18 | 3.98 | 0.978 |
| Example 2 | 0.4 | 335.1 | 90.01 | 3.50 | 0.986 |
| Example 3 | 0.6 | 331.9 | 101.15 | 3.91 | 0.993 |
| Example 4 | 0.8 | 329.9 | 89.73 | 3.54 | 1.001 |
| Comp. Ex. 2 | 1.0 | 327.2 | 90.87 | 3.24 | 1.009 |

<Measurement of Oxygen Storage Capacity (OSC) and Oxygen Release Rate>

The oxygen storage capacity and the oxygen release rate for each of the composite oxides obtained in Examples 1 to 4 and Comparative Examples 1 to 4 were measured in the method described below. Specifically, using a thermogravimeter "TGA-50" (manufactured by Shimadzu Corporation) as a measuring device, a lean gas (O$_2$ (5% by volume)+N$_2$ (balance)) and a rich gas (H$_2$ (5% by volume)+N$_2$ (balance)) were alternately caused to flow through 20 mg of the sample powder under a condition of 400° C. by switching them every 5 minutes. The oxygen storage capacity and the oxygen release rate were obtained from an average of the values of the increase in mass of the composite oxide measured three times. The obtained results are presented in Table 3 and FIGS. 4 and 5.

<Heat-Resistance Test>

Each of the composite oxides obtained in Example 2 and Comparative Example 1 was left in a reducing atmosphere (H$_2$ (5% by volume)+N$_2$ (balance)) at 800° C. for 5 hours, thereby obtaining a sample after Heat-Resistance Test. Then, the X-ray diffraction pattern of the sample after Heat-Resistance Test was measured by the X-ray diffraction method as in the above-described X-ray diffraction (XRD) measurement. The obtained X-ray diffraction patterns are presented in FIG. 3. Moreover, the oxygen storage capacity and the oxygen release rate of the sample after Heat-Resistance Test were also obtained in the same manner as in the above-described measurement of the oxygen storage capacity (OSC) and the oxygen release rate. The obtained results are presented in Table 3.

TABLE 3

| | x in Composition Formula | OSC [μmol-O/g] @400° C. | Oxygen Release Rate [μmol-O/g · s] @400° C. |
|---|---|---|---|
| Comp. Ex. 1 | 0 | 790 (110 [*3]) | 3.2 (0.4 [*4]) |
| Example 1 | 0.2 | 1460 | 10.4 |
| Example 2 | 0.4 | 1120 (1080 [*3]) | 11.0 (10.8 [*4]) |
| Example 3 | 0.6 | 540 | 7.7 |
| Example 4 | 0.8 | 180 | 6.2 |
| Comp. Ex. 2 | 1.0 | 0 | 0 |
| Comp. Ex. 3 | 0 [*1] | 120 | 0.5 |
| Comp. Ex. 4 | 0.2 [*2] | 730 | 3.1 |

[*1] A mixture powder of La$_3$O$_3$ and CoO in which an atomic ratio among La, Co and Al (La:Co:Al) is 1:1:0.
[*2] A mixture powder of LaCoO$_3$ and Al$_2$O$_3$ in which an atomic ratio among La, Co and Al (La:Co:Al) is 1:1:0.2.
[*3] OSC after Heat-Resistance Test [μmol-O/g] @400° C.
[*4] Oxygen release rate after Heat-Resistance Test [μmol-O/g · s] @400° C.

<Tolerance Factor>

Figure 6:
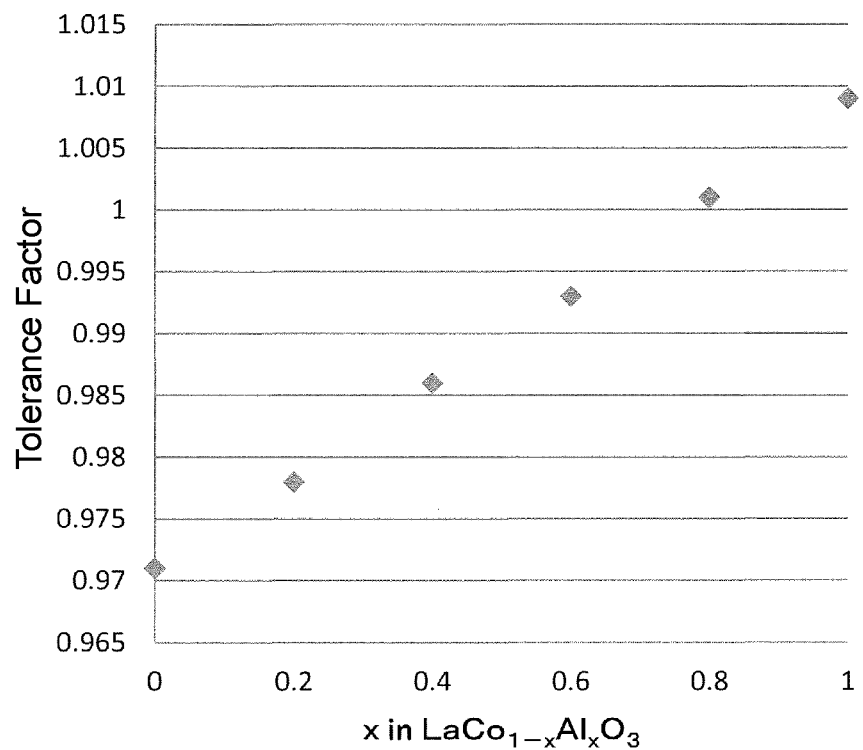
FIG. 6 is a graph presenting a tolerance factor of the composite oxides obtained in Examples 1 to 4 and Comparative Examples 1 and 2.

For each of the composite oxides obtained in Examples 1 to 4 and Comparative Examples 1 and 2, the tolerance factor (t) defined by the above-specified formula (2) was obtained. The obtained results are presented in Table 2 and FIG. 6.

<Evaluation Results of Composite Oxides>

As is apparent from the results presented in FIG. 1, it was confirmed that all of the La—Co—Al composite oxides of the present invention obtained in Examples 1 to 4, the La—Co composite oxide obtained in Comparative Example 1, and the La—Al composite oxide obtained in Comparative Example 2 were each obtained as a single-phase composite oxide having a perovskite structure.

In addition, as is apparent from the results presented in FIG. 2, the lattice parameters of the La—Co—Al composite oxides of the present invention obtained in Examples 1 to 4 demonstrated a linearity of a lattice parameter change along with an increase in the amount of aluminum solid-dissolved in accordance with Vegard's law, which confirmed that each of the La—Co—Al composite oxides was in the form in which the aluminum was solid-dissolved in the La—Co composite oxide having the perovskite structure, thereby forming a solid solution phase, in other words, the solid solution expressed by the composition formula: LaCo$_{1-x}$Al$_x$O$_3$ was formed.

Moreover, all the La—Co—Al composite oxides of the present invention obtained in Examples 1 to 4 demonstrated that no peaks corresponding to the alumina (Al$_2$O$_3$) not solid-dissolved were present in the X-ray diffraction (XRD) measurement, and therefore verified that the amount of the alumina not solid-dissolved was equal to or lower than a detection limit.

Figure 4:
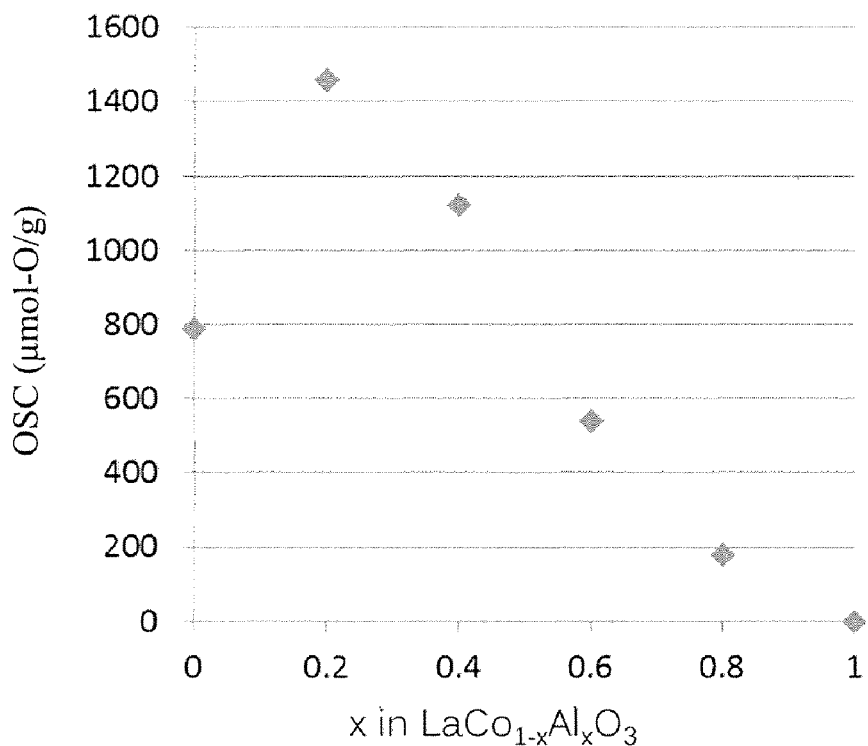
FIG. 4 is a graph presenting an oxygen storage capacity (OSC) at 400° C. of the composite oxides obtained in Examples 1 to 4 and Comparative Examples 1 and 2.
Figure 5:
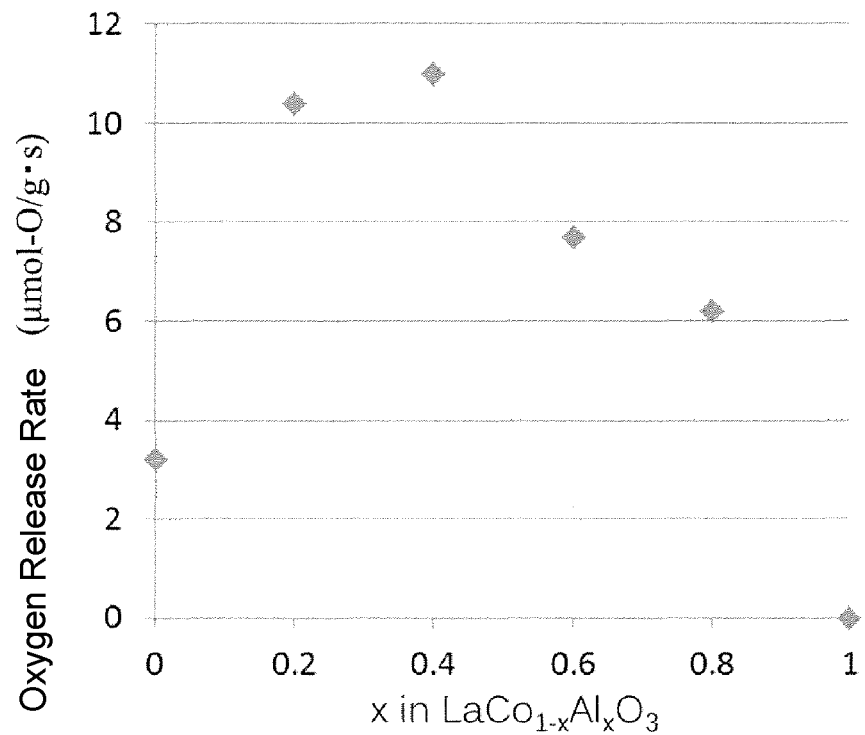
FIG. 5 is a graph presenting an oxygen release rate (O-release rate) at 400° C. of the composite oxides obtained in Examples 1 to 4 and Comparative Examples 1 and 2.

Further, as is apparent from the results presented in FIGS. 4 and 5, the La—Co—Al composite oxides of the present invention demonstrated remarkable enhancements of the oxygen storage capacity (OSC) and the oxygen release rate as a result of the solid-dissolution of the aluminum in an amount corresponding to x=0.2 to 0.4 in the above-specified composition formula in the La—Co composite oxide having the perovskite structure.

Meanwhile, the La—Co composite oxides having the perovskite structure in each of which the aluminum in an amount corresponding to x=0.6 to 0.8 in the above-specified composition formula was solid-dissolved were observed to have a good oxygen release rate, although the oxygen storage capacity tended to decrease along with a decrease in the content of Co. In contrast to them, the La—Co composite oxide obtained in Comparative Example 1 demonstrated a worse oxygen release rate, the La—Al composite oxide obtained in Comparative Example 2 had no OSC, and the mixture powder of La$_2$O$_3$ and CoO obtained in Comparative Example 3 and the mixture powder of LaCoO$_3$ and Al$_2$O$_3$ obtained in Comparative Example 4 also demonstrated worse oxygen release rates. In view of these results, the present inventors surmise that the oxygen storage material of the present invention can exhibit a good oxygen release rate even at a relatively low temperature of about 400° C. because the aluminum is solid-dissolved in the La—Co composite oxide having the perovskite structure and the substitution with aluminum atoms makes dissociation of oxygen easier and accordingly reduces the activation energy for oxygen release.

Figure 3:
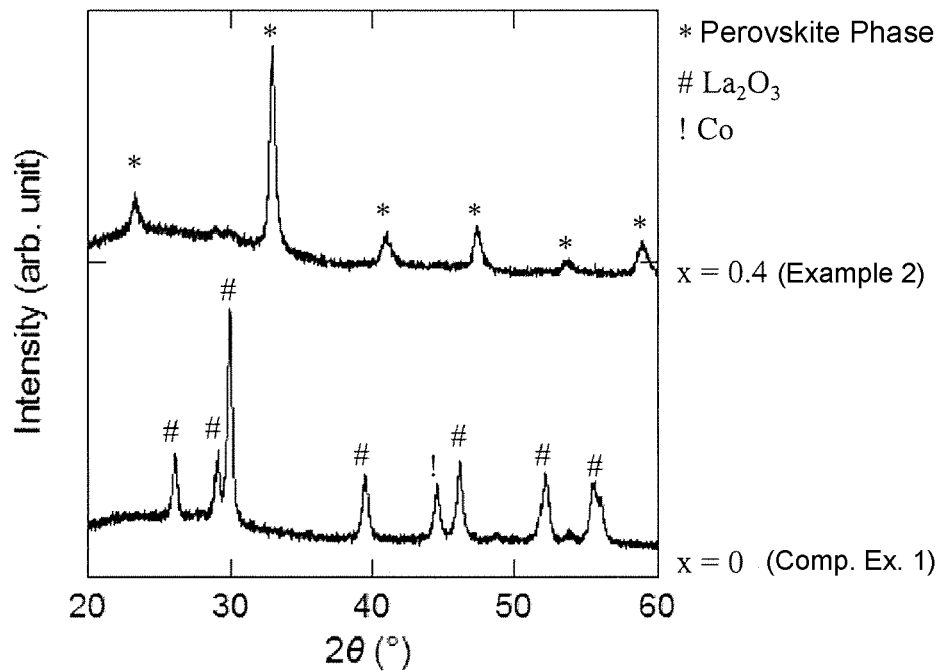
FIG. 3 is a graph presenting X-ray diffraction patterns of the composite oxides obtained in Example 2 and Comparative Example 1 after Heat-Resistance Test.

Moreover, as is apparent from the results presented in FIG. 3, the La—Co composite oxide obtained in Comparative Example 1 was observed to cause thermal decomposition and form a La$_2$O$_3$ phase and a Co phase due to Heat-Resistance Test at 800° C. In contrast, the La—Co—Al composite oxide of the present invention obtained in Example 2 was observed to cause no thermal decomposition even in Heat-Resistance Test at 800° C. and keep the single phase of the La—Co—Al composite oxide having the perovskite structure. In addition, as is apparent from the results presented in Table 3, the La—Co composite oxide obtained in Comparative Example 1 was observed to significantly decrease the oxygen storage capacity (OSC) and the oxygen release rate due to Heat-Resistance Test at 800° C. On the other hand, the La—Co—Al composite oxide of the present invention obtained in Example 2 was observed to exhibit almost no decreases in the oxygen storage capacity (OSC) and the oxygen release rate in Heat-Resistance Test at 800° C. and keep the good OSC and the good oxygen release rate. These results confirmed that the La—Co—Al composite oxide of the present invention had high heat resistance, and the present inventors surmise that the enhancement of the heat resistance was achieved because the aluminum solid-dissolved in the La—Co composite oxide having the perovskite structure relaxed the distortion of the perovskite structure and stabilized the perovskite phase. The above surmise of the present inventors is supported by the observation that the tolerance factor (t) becomes closer to 1 along with an increase in the amount of the aluminum solid-dissolved in the La—Co composite oxide as presented in FIG. 6.

INDUSTRIAL APPLICABILITY

As described above, according to the present invention, it is possible to provide an oxygen storage material which is capable of exhibiting a good oxygen release rate even at a relatively low temperature of about 400° C., and has such high heat resistance as to sufficiently suppress the thermal decomposition under a high temperature condition at about 600° C. to about 1000° C., and to provide a production method capable of obtaining such an oxygen storage material efficiently and reliably.

Therefore, oxygen storage materials of the present invention are favorably usable as a support, a promoter, a catalyst atmosphere adjuster, and the like for catalysts for purification of exhaust gas for vehicles and the like.

What is claimed is:

1. An oxygen storage material comprising a La—Co—Al-based composite oxide containing lanthanum, cobalt and aluminum, wherein
   the La—Co—Al-based composite oxide is in a form in which at least part of the aluminum is solid-dissolved in a La—Co composite oxide having a perovskite structure, and has a composition expressed by the following chemical formula (1):

$$LaCo_yAl_xO_\delta \qquad (1)$$

where x and y are numbers satisfying conditions of 0<x<1 and 0<y<1, where x+y=0.5 to 1.5, and δ is a number of 1.5 to 4.5.

2. The oxygen storage material according to claim 1, wherein in the chemical formula (1), x and y are numbers satisfying conditions of x=0.1 to 0.5 and y=0.5 to 0.9, where x+y=1, and δ is 3.

3. The oxygen storage material according to claim 1, wherein 90 at % or more of the aluminum is solid-dissolved in the La—Co composite oxide.

4. The oxygen storage material according to claim 1, wherein the La—Co—Al-based composite oxide is a composite oxide having a perovskite structure in which a tolerance factor (t) is within a range of 0.975 to 1.007, the tolerance factor (t) defined by the following formula (2):

$$t=(r_A+r_O)/\{2^{1/2}\times(r_B+r_O)\} \qquad (2)$$

where t is the tolerance factor, $r_A$ is an ionic radius of La, $r_B$ is an arithmetic mean of ionic radii of Co and Al, and $r_O$ is an ionic radius of an oxide ion ($O^{2-}$).

5. A method for producing an oxygen storage material, comprising the steps of:
   forming a metal hydroxycarboxylic acid complex in a solution containing a lanthanum salt, a cobalt salt and an aluminum salt as raw material salts, hydroxycarboxylic acid, and glycol;
   causing esterification reaction in the solution to form a polymer gel in which the metal hydroxycarboxylic acid complex is dispersed;
   thermally decomposing the polymer gel to obtain a metal oxide precursor; and
   calcining the metal oxide precursor to obtain the oxygen storage material comprising the La—Co—Al-based composite oxide according to claim 1.

6. The method for producing an oxygen storage material according to claim 5, wherein in the chemical formula (1), x and y are numbers satisfying conditions of x=0.1 to 0.5 and y=0.5 to 0.9, where x+y=1, and δ is 3.

7. The method for producing an oxygen storage material according to claim 5, wherein 90 at % or more of the aluminum is solid-dissolved in the La—Co composite oxide.

8. The method for producing an oxygen storage material according to claim 5, wherein the La—Co—Al-based composite oxide is a composite oxide having a perovskite structure in which a tolerance factor (t) is within a range of 0.975 to 1.007, the tolerance factor (t) defined by the following formula (2):

$$t=(r_A+r_O)/\{2^{1/2}\times(r_B+r_O)\} \quad (2)$$

where t is the tolerance factor, $r_A$ is an ionic radius of La, $r_B$ is an arithmetic mean of ionic radii of Co and Al, and $r_O$ is an ionic radius of an oxide ion ($O^{2-}$).

* * * * *